(12) United States Patent
Ogan et al.

(10) Patent No.: US 11,624,512 B2
(45) Date of Patent: Apr. 11, 2023

(54) TANKLESS WATER HEATER HAVING INTEGRATED SCALE CONTROL MODULE

(71) Applicant: A. O. SMITH CORPORATION, Milwaukee, WI (US)

(72) Inventors: Jeffrey T. Ogan, Milwaukee, WI (US); Jason F. Janz, Milwaukee, WI (US); Crawford G. Arrington, Milwaukee, WI (US)

(73) Assignee: A.O. Smith Corporation, Milwaukee, WI (US)

( * ) Notice: Subject to any disclaimer, the term of this patent is extended or adjusted under 35 U.S.C. 154(b) by 0 days.

(21) Appl. No.: 17/499,629

(22) Filed: Oct. 12, 2021

(65) Prior Publication Data

US 2022/0034522 A1 Feb. 3, 2022

Related U.S. Application Data

(63) Continuation of application No. PCT/US2020/052843, filed on Sep. 25, 2020.

(60) Provisional application No. 62/907,280, filed on Sep. 27, 2019.

(51) Int. Cl.
*F24D 19/00* (2006.01)
*F24H 1/30* (2022.01)
*F24H 1/40* (2022.01)

(52) U.S. Cl.
CPC ........... *F24D 19/0092* (2013.01); *F24H 1/30* (2013.01); *F24H 1/40* (2013.01)

(58) Field of Classification Search
CPC .................................................. F24D 19/0092
See application file for complete search history.

(56) References Cited

U.S. PATENT DOCUMENTS 2,040,628 A   5/1936  Recker
5,201,807 A   4/1993  Liljenberg et al.
(Continued)

FOREIGN PATENT DOCUMENTS

CN   101046322 A   10/2007
CN   205026954 U    2/2016
CN   207407509 U    5/2018

OTHER PUBLICATIONS

International Search Report and Written Opinion of PCT/US2020/052843, dated Feb. 17, 2021.
(Continued)

*Primary Examiner* — Nathaniel Herzfeld
(74) *Attorney, Agent, or Firm* — Michael Best & Friedrich LLP

(57) ABSTRACT

A tankless water heater includes a scale control module (SCM). The SCM is mounted inside or outside of a cabinet which encloses a heat exchanger and source of heat of the water heater. The SCM may include a connector and a cartridge removably attaching to the connector or may only include a cartridge permanently affixed to the tankless water heater. The tankless water heater includes a continuous water pathway inside the cabinet to supply water to all components of the tankless water heater, including the SCM. The tankless water heater receives supply water at its inlet, treats the supply water in the SCM to generate treated water having reduced scale-forming characteristics compared to the supply water, and heats the treated water in the heat exchanger to generate heated treated water.

19 Claims, 8 Drawing Sheets

(56) References Cited

U.S. PATENT DOCUMENTS

| | | | |
|---|---|---|---|
| 5,662,779 A * | 9/1997 | Greene | C02F 1/04 |
| | | | 202/181 |
| 5,878,192 A | 3/1999 | Jackson | |
| 6,267,085 B1 | 7/2001 | Alphs | |
| 2003/0173304 A1* | 9/2003 | David Joslin | B01D 24/14 |
| | | | 210/702 |
| 2010/0263688 A1 | 10/2010 | Monsrud et al. | |
| 2012/0192813 A1 | 8/2012 | Evans et al. | |
| 2013/0118987 A1* | 5/2013 | VerMurlen | C02F 1/685 |
| | | | 210/696 |
| 2014/0182624 A1 | 7/2014 | Taylor | |
| 2018/0172314 A1* | 6/2018 | Kameyama | F24H 9/2042 |
| 2019/0177184 A1 | 6/2019 | Averbeck et al. | |
| 2019/0210903 A1* | 7/2019 | Browne | B01F 1/0027 |
| 2020/0200397 A1* | 6/2020 | Trant | C02F 1/42 |
| 2020/0308036 A1* | 10/2020 | Trant | F24H 1/107 |

OTHER PUBLICATIONS

International Preliminary Report on Patentability for Application No. PCT/US2020/052843 dated Mar. 15, 2022, dated Apr. 7, 2022 (15 pages).
Yan Duan & Weiming Li. Household Water Heater Reader. pp. 39-40. Aug. 31, 2013. (5 pages with statement of relevance).
Chinese Patent Office First Office Action for application 202080063044.2, dated Feb. 2, 2023,11 pages with translation.

\* cited by examiner

TANKLESS WATER HEATER HAVING INTEGRATED SCALE CONTROL MODULE

CROSS REFERENCE TO RELATED APPLICATIONS

This application is a continuation of International Patent Application PCT/US2020/052843 filed Sep. 25, 2020, which in turn claims priority to U.S. Provisional Patent Application No. 62/907,280 filed on Sep. 27, 2019, the contents of both of which are incorporated by reference herein.

BACKGROUND

The present invention relates to a tankless water heater having an integrated scale control module.

Traditional tankless water heaters have a water hookup for cold water in and hot water out, a fuel hookup for the supply of natural gas or propane (for gas-fired tankless water heaters), a vent hookup for the venting of products of combustion, and possibly an electrical hook up to power the water heater's controller and electrical components such as a water pump and a blower. If the installation of a traditional tankless water heater calls for a scale control solution due to the characteristics of water being supplied to the water heater, that solution is plumbed into the water supply line upstream of the water heater. A scale control solution is called for when the supply water includes minerals and other impurities that can lead to scale buildup in the heat exchanger of the tankless water heater.

SUMMARY

In one embodiment, the invention provides a tankless water heater comprising: a source of heat; a scale control module for treating supply water to generate treated water with reduced scale-forming characteristics, the scale control module including a SCM inlet adapted to receive the supply water and a SCM outlet for delivering the treated water from the scale control module; a heat exchanger having a water inlet in fluid communication with the scale control module to receive the treated water, the heat exchanger adapted to transfer heat from the source of heat to the treated water as the treated water flows through the heat exchanger to generate heated treated water, the heat exchanger including a water outlet for delivery of the heated treated water; and a cabinet defining an interior space which encloses the heat exchanger and source of heat; wherein the SCM inlet and the SCM outlet are within the interior space.

In some embodiments, the cabinet includes a wall to which the scale control module is rigidly mounted. In some embodiments, the scale control module includes a SCM cartridge in which the supply water is treated, the SCM cartridge being external to the cabinet. In some embodiments, the scale control module further includes a SCM connector including the SCM inlet and SCM outlet and a SCM cartridge that is removably mounted to the SCM connector. In some embodiments, the source of heat includes a gas burner generating products of combustion and the heat exchanger includes a plurality of finned tubes through which the treated water flows and over which the products of combustion flow.

In another embodiment, the invention provides a tankless water heater including a source of heat, and a scale control module for treating supply water to generate treated water with reduced scale-forming characteristics compared to the supply water. The scale control module includes a SCM inlet adapted to receive the supply water and a SCM outlet for delivering the treated water from the scale control module. A heat exchanger has a water inlet in fluid communication with the SCM outlet to receive the treated water. The heat exchanger is adapted to transfer heat from the source of heat to the treated water as the treated water flows through the heat exchanger to generate heated treated water. The heat exchanger includes a water outlet for delivery of the heated treated water. A cabinet defines an interior space which encloses at least a portion of the heat exchanger. The SCM inlet and the SCM outlet are within the interior space.

In yet another embodiment, the invention provides a tankless water heater including a source of heat, and a scale control module for treating supply water to generate treated water with reduce scale-forming characteristics. The scale control module includes a SCM connector having a SCM inlet adapted to receive the supply water and a SCM outlet for delivering the treated water from the scale control module, and a SCM cartridge that is removably mounted to the SCM connector. The supply water is treated by the SCM cartridge to become treated water. A heat exchanger has a water inlet in fluid communication with the SCM outlet to receive the treated water. The heat exchanger is adapted to transfer heat from the source of heat to the treated water as the treated water flows through the heat exchanger to generate heated treated water. The heat exchanger includes a water outlet for delivery of the heated treated water. A cabinet defines an interior space which encloses at least a portion of the heat exchanger. The SCM connector is secured to a wall of the cabinet such that the SCM inlet and the SCM outlet are within the interior space and the SCM cartridge is external to the cabinet.

In yet still another embodiment, the invention provides a method of generating heated treated water. The method includes (a) providing a tankless water heater including a cabinet defining an interior space. A water supply inlet extends through the cabinet into the interior space. A hot water outlet extends through the cabinet out of the interior space. A source of heat is at least partially within the interior space. A heat exchanger is at least partially enclosed in the interior space. A scale control module has a SCM inlet and a SCM outlet. At least the SCM inlet and the SCM outlet are enclosed in the interior space. The method further includes (b) generating heat with the source of heat, (c) providing supply water to the tankless water heater through the water supply inlet, and (d) conducting the supply water from the water supply inlet into the scale control module through the SCM inlet. The method further includes (e) treating the supply water in the scale control module to generate treated water with reduced scale-forming characteristics compared to the supply water, and (f) conducting the treated water from the scale control module through the SCM outlet to the heat exchanger. The method further includes (g) transferring the heat generated by the source of heat to the treated water as the treated water flows through the heat exchanger to generate the heated treated water, and (h) delivering the heated treated water out of the cabinet through the hot water outlet.

Other aspects of the invention will become apparent by consideration of the detailed description and accompanying drawings.

DETAILED DESCRIPTION

Figure 1:
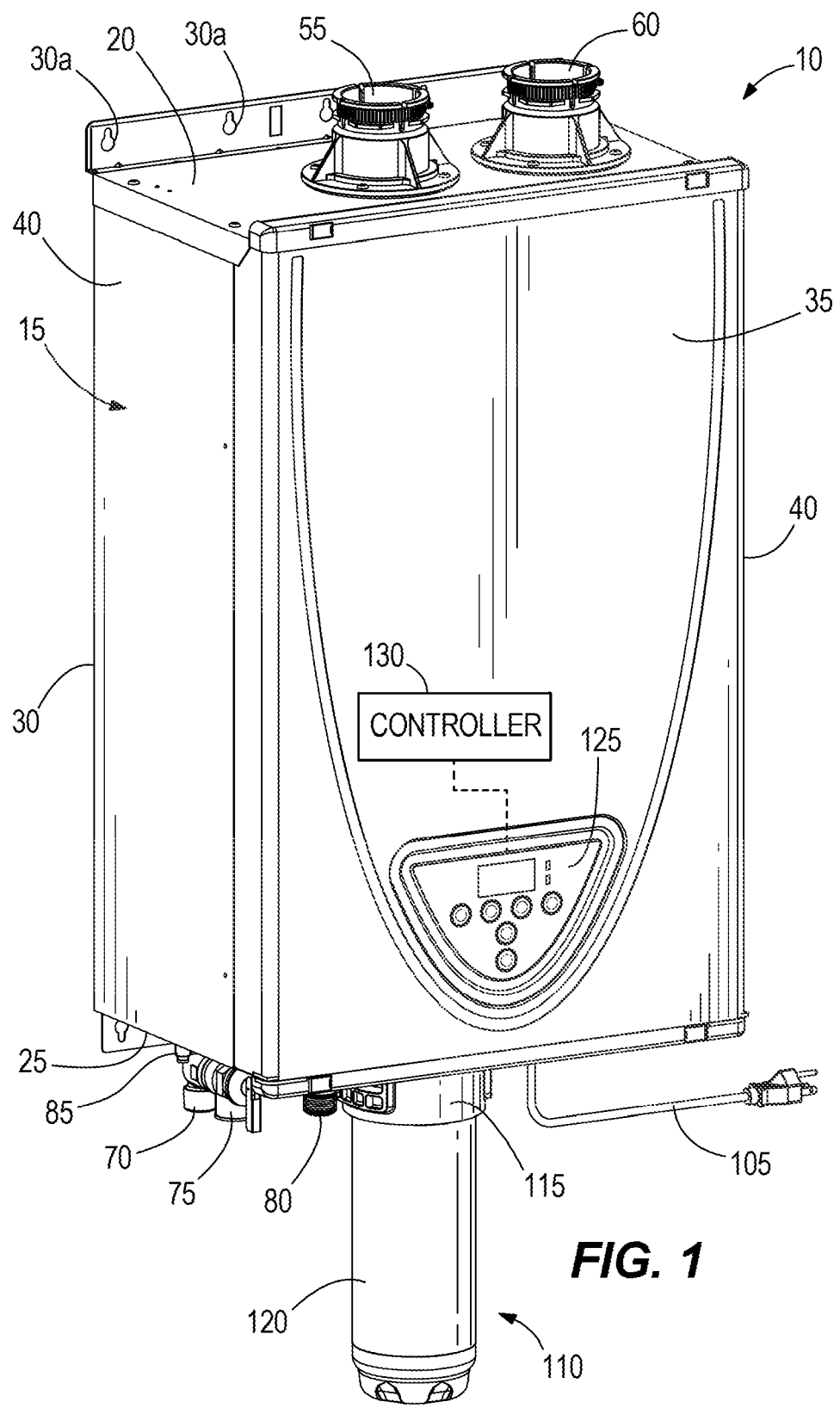
FIG. 1 is a perspective view of a water heater constructed according to the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The present invention addresses problems and costs that can arise from installing a separate scale control solution upstream of a tankless water heater. Such problems include, for example, the difficulty and cost of installing such a scale control solution. Such problems and costs have led to limited adoption of scale control solutions in the market despite the fact that heat exchanger failure in tankless water heaters is most commonly associated with scale buildup in the heat exchanger.

The present invention addresses the problem of scale buildup in the heat exchanger by integrating a scale control module (SCM) into a tankless water heater. As used herein, the term SCM includes a cartridge containing a media that renders scale-inducing impurities (e.g., calcium and magnesium) in water inert or non-reactive in the sense that the scale-inducing impurities are in a state that will not bind to the heat exchanger and form scale on the heat exchanger. Water that has flown through the SCM cartridge has reduce scale-forming characteristics as a consequence of its interaction with the media. The water flowing out of the SCM cartridge (with reduced scale-forming characteristics) is referred to herein as treated water. The term "reduced" when describing the scale-forming characteristics of the treated water is in reference to the supply water provided to the water heater.

As used herein, the terms "integration," "integrate," "integrated," and other variations mean that the SCM is not an optional component or add-on for the water heater. A tankless water heater with integrated SCM is a plug-and-play system for the installer. The water supply and hot water delivery conduits can be hooked up to the tankless water heater and it is ready to go with the scale control functionality. No additional plumbing to a separate scale control solution is required when installing a tankless water heater having an integrated SCM according to the present invention. A tankless water heater having an integrated SCM according to the present invention is simpler to install than a traditional water heater with a separate SCM in the water supply line. A simpler installation will typically take less time and lower cost compared to a more complex installation. As such, the present invention has the potential to reduce installation time and cost compared to traditional tankless water heaters that required a separate upstream SCM.

A tankless water heater having an integrated SCM according to the present invention may include a recirculation line. Indeed, the embodiment of the invention described below and illustrated in the accompanying drawings includes a recirculation line. It is noted that the water supply to the illustrated tankless water heater could be directly connected to the recirculation return so that supply water would bypass the SCM. Nonetheless, the illustrated tankless water heater is still considered a tankless water heater having an integrated SCM because the SCM is a permanent part of the tankless water heater and supply water must flow through the SCM prior to reaching the heat exchangers in the ordinary intended configuration of the tankless water heater that uses the SCM.

A tankless water heater having an integrated SCM according to the present invention may include a permanent SCM cartridge or a SCM cartridge that can be removed and replaced. Both would be considered an "integrated" SCM as the term is used herein, and the term "integrated" should not be construed as limited to a permanent SCM cartridge.

A characteristic of the invention, as will be explained below, is a continuous water pathway that supplies all components of a tankless water heater. To the knowledge of the inventors, there is no tankless water heater currently available that includes a continuous pathway housed inside the cabinet of the tankless water heater. This provides the plug-and-play aspect of the invention mentioned above. In each embodiment or configuration of the present invention, the water supply hookup for the tankless water heater communicates with a water conduit internal to the cabinet. The water flows through the internal components and out the hot water outlet of the tankless water heater without external plumbing. As mentioned above and discussed in more detail below, the integrated SCM cartridge may be configured as an internal or external component, but in both instances the SCM connections (i.e., the inlet and outlet to the SCM) are internal to the cabinet. To the inventors' knowledge there is no tankless water heater currently configured this way. Consequently, the addition of a scale control solution to known tankless water heaters requires a water pathway connections exterior to the cabinet which would require a relatively more complex installation process.

Figure 2:
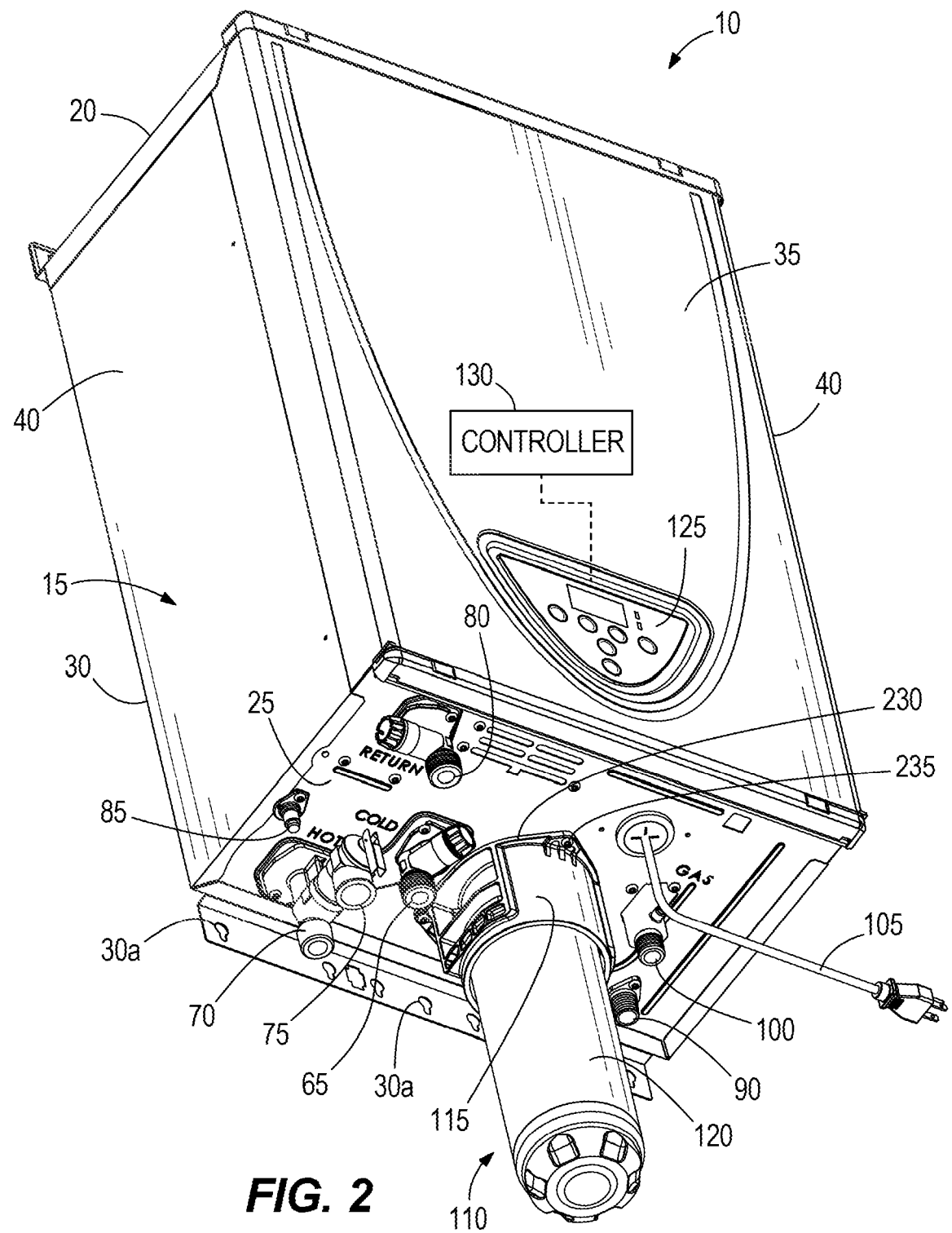
FIG. 2 is a bottom perspective view of the water heater.
Figure 3:
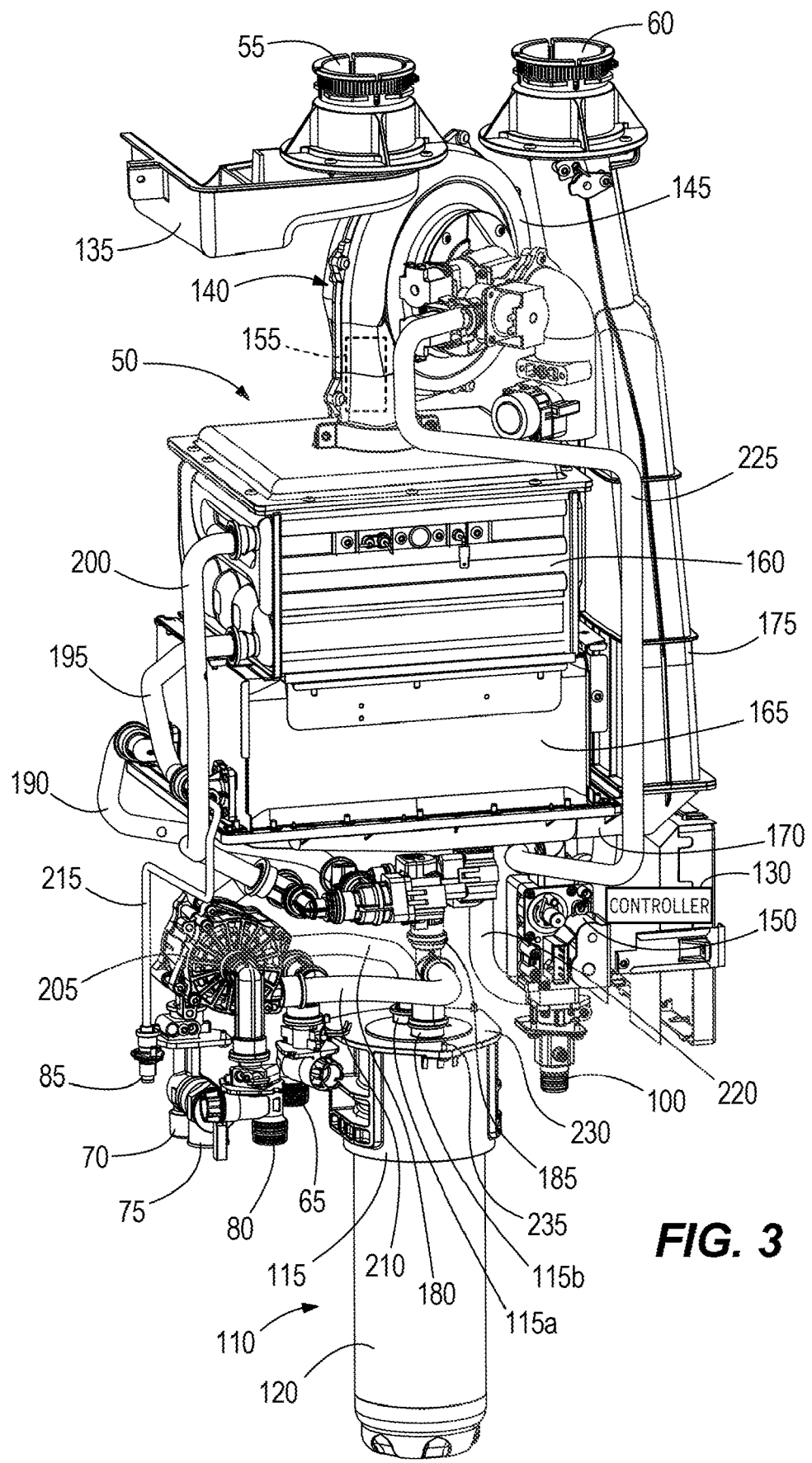
FIG. 3 is a front perspective view of the water heater with the cabinet removed.
Figure 4:
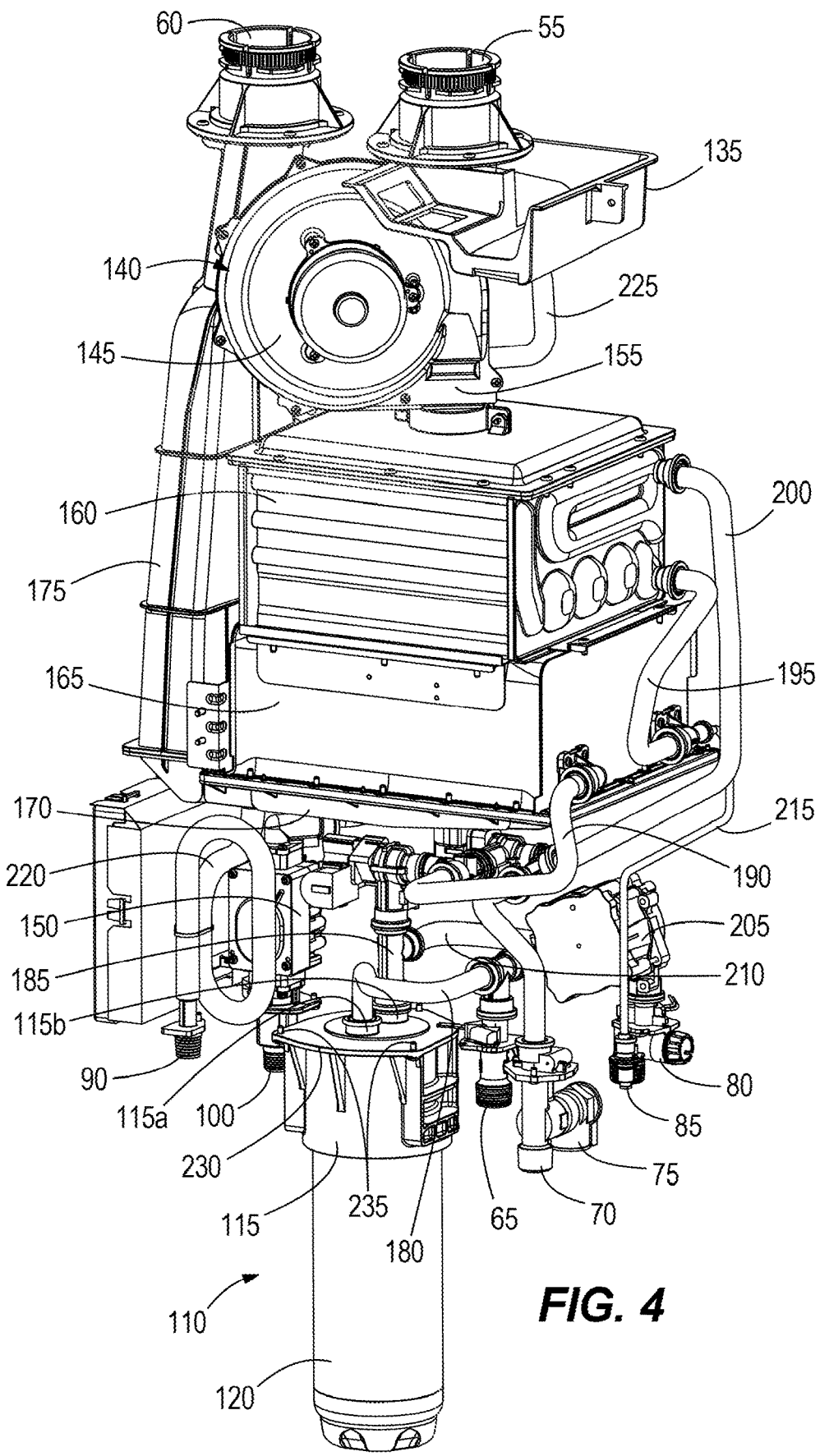
FIG. 4 is a rear perspective view of the water heater with the cabinet removed.
Figure 5:
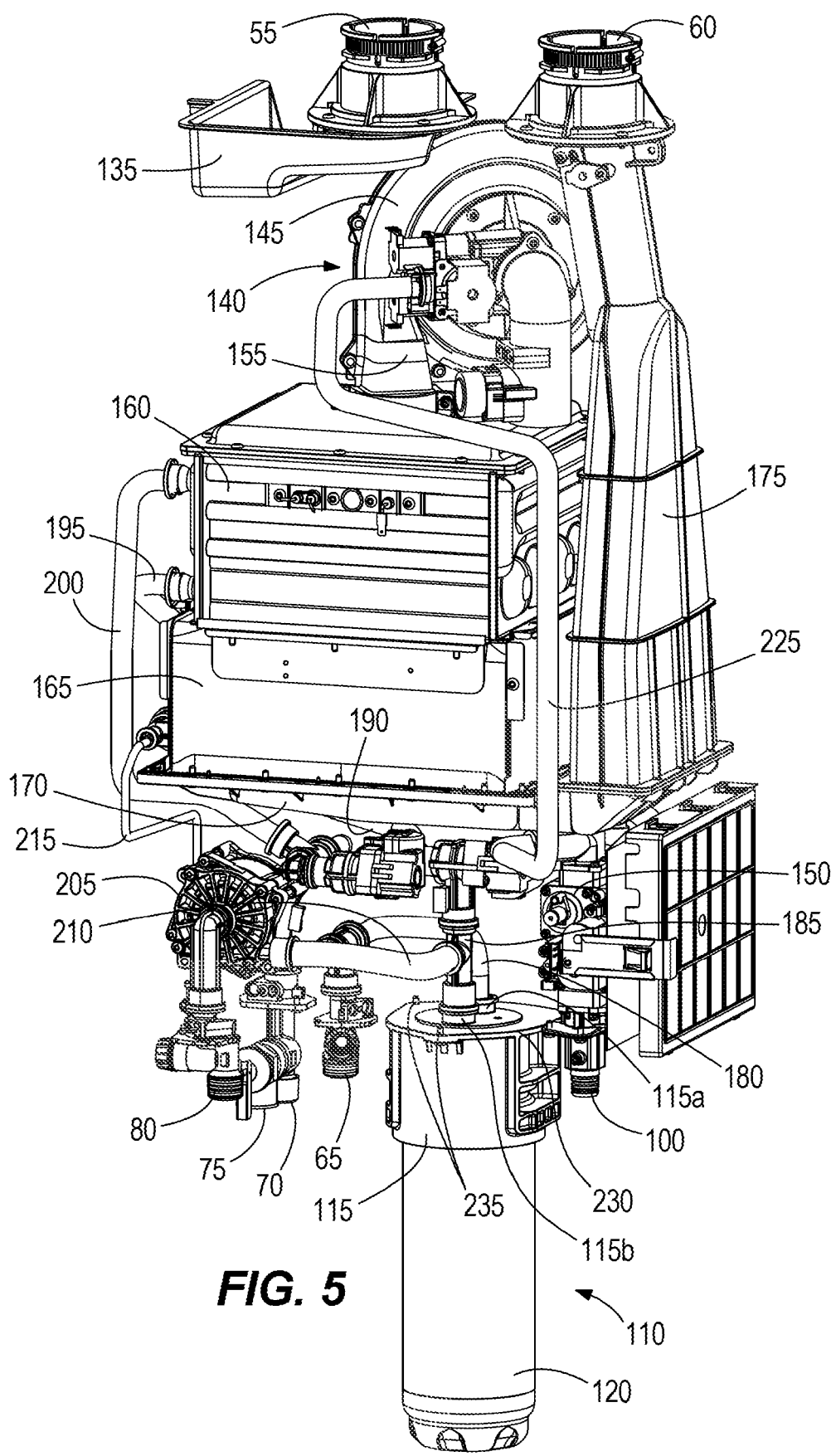
FIG. 5 is a side perspective view of the water heater with the cabinet removed.
Figure 6:
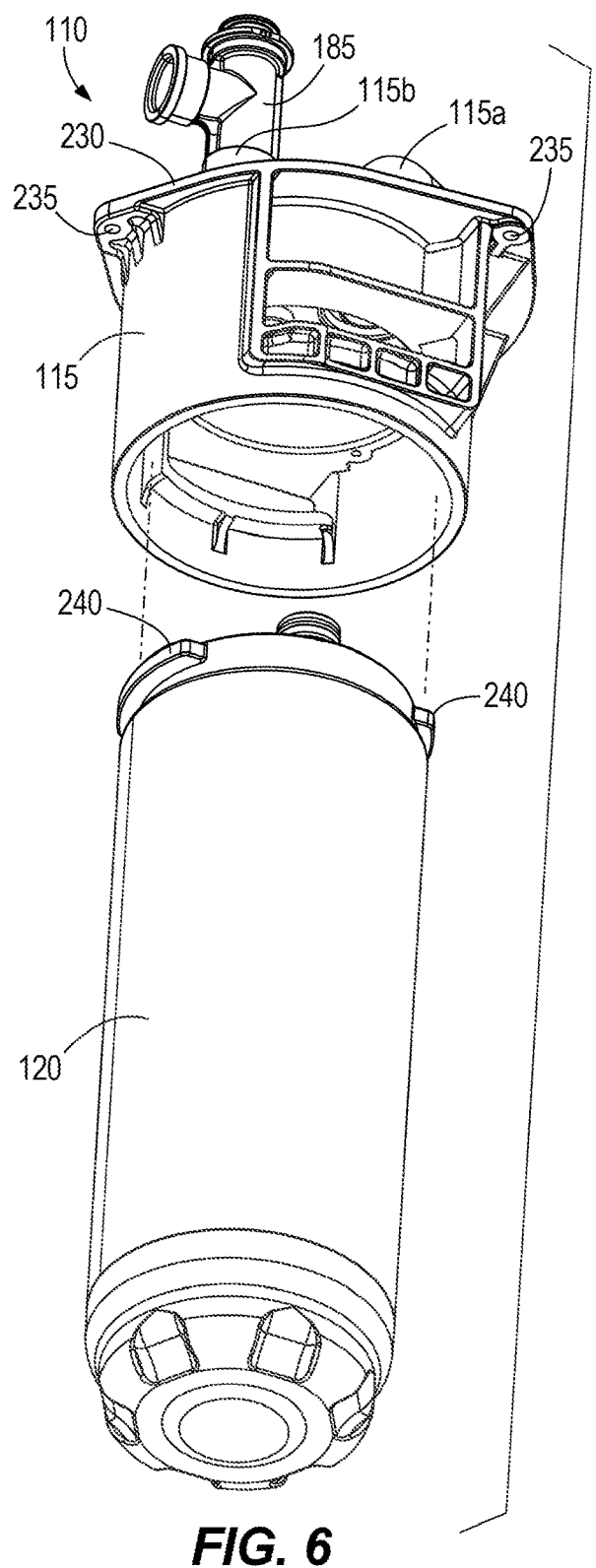
FIG. 6 is a perspective view of a scale control module of the water heater with a cartridge removed.
Figure 7:
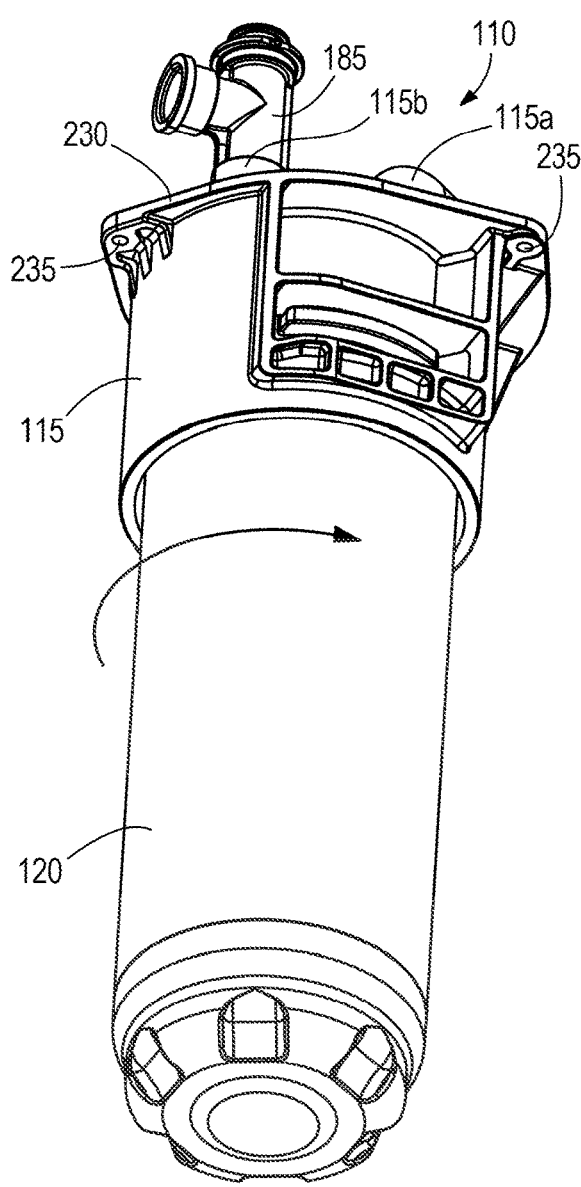
FIG. 7 is a perspective view of the scale control module with the cartridge installed.

Referring to FIGS. 1-2, the present invention provides a tankless water heater 10 including a case or cabinet 15. The cabinet 15 includes a top wall 20, a bottom wall 25, a back wall 30, a front wall 35, and side walls 40 as illustrated. An interior space 50 (FIG. 3) is defined between the walls 20, 25, 30, 35, 40 of the cabinet 15. As illustrated in FIG. 1, an air intake 55 and an exhaust 60 are mounted to and penetrate through the top wall 20. As illustrated in FIG. 2, a water supply inlet 65, hot water outlet 70 (including a pressure relief valve 75), recirculation return 80, bypass drain 85, condensate drain 90, gas hookup 100, and electric power cord 105 penetrate through or are mounted to the bottom wall 25.

As will be described in more detail below, the tankless water heater 10 also includes a scale control module (SCM) 110 which in the embodiment illustrated in FIGS. 1-7 includes a SCM connector or manifold 115 and a SCM cartridge 120 received in the SCM connector 115. The SCM connector 115 is mounted to the bottom wall 25 and (referring to FIGS. 3-7) includes a SCM inlet 115a for receiving supply water to the SCM cartridge 120 and a SCM outlet 115b for delivering treated water from the SCM cartridge 120. The SCM inlet 115a and SCM outlet 115b are referred to collectively as the SCM connections and are internal to the cabinet 15, within the interior space 50.

The cartridge 120 may be a multi-stage design, containing one main filter and one (or more) pre-filter(s) together in a single housing or in multiple housings connected in tandem. The filter or filters can contain a bypass that circumvents one or more of the pre-filter stages in the case of abnormally high contamination creating an unacceptable pressure drop. The purpose of the main filter will be to provide scale reduction treatment for a tankless water heater. The purpose of the pre-filter(s) is to improve or protect the scale reduction capability of the main filter. The term "filter" is used herein to include physical filters and also media that reacts with scale-inducing impurities (e.g., calcium and magnesium) in the water to render the scale-inducing impurities inert.

During installation, the air intake 55 may be connected to an air supply conduit or may simply be exposed to the air around the tankless water heater 10. The exhaust 60 is connected to an exhaust system of the room or building in which the tankless water heater 10 is installed. The water supply inlet 65 is connected to a water supply for the building for the receipt of supply water (i.e., untreated water) to the water heater 10 and the hot water outlet 70 is connected to the hot water delivery system of the building for the delivery of heated treated water to an end user. The recirculation return 80 is connected to a remote point in the hot water delivery system (e.g., near a remote hot water faucet). The bypass drain 85 and condensate drain 90 can be plumbed to a water disposal (e.g. sewer) system of the building. The gas hookup 100 is connected to a supply of combustible gas (e.g., natural gas). The power cord 105 is plugged into an electrical outlet. Each of the water supply inlet 65, hot water outlet 70, recirculation return 80, bypass drain 85, condensate drain 90, gas hookup 100, and power cord 105 can be characterized as extending through the bottom wall 25 of the cabinet into or out of the interior space 50.

With continued reference to FIGS. 1 and 2, the back wall 30 includes mounting structure 30a for hanging the tankless water heater 10 on a support structure. A user interface 125 is mounted in the front wall 35. The front wall 35 in the illustrated embodiment is removable from the side walls 40, top wall 20, and bottom wall 25 for access to and servicing of the components of the tankless water heater 10 in the interior space 50 (the "internal components").

The internal components include, among other components discussed below, a controller 130 (FIGS. 1-3) which is either integrated with the user interface 125 or separately mounted in the interior space 50 (e.g., in the location and housing noted in FIG. 3), an air intake pan 135, a power burner 140 (including a blower 145, a gas valve 150, and combustor 155), a primary heat exchanger 160, a secondary heat exchanger 165, a condensate pan 170, and a flue 175. It should be noted that the illustrated power burner 140 is only one example of a source of heat suitable for use with the present invention. The source of heat could alternatively be an electric heating element, a condenser coil of a refrigeration cycle (e.g., a heat pump), hydronic heat from a boiler, solar power, or any other suitable source of heat for the given application. As illustrated, all the internal components are fully enclosed within the interior space 50. In other embodiments one or more of the internal components (e.g., a portion of the power burner 140 or heat exchanger 160, 165) may extend out of the interior space 50 if required for a particular purpose, in which case such internal components would be at least partially enclosed within the interior space 50.

The water plumbing includes a first conduit 180 communicating between the water supply inlet 65 and the SCM inlet 115a of the SCM connector 115, a tee 185 communicating with the SCM outlet 115b of the SCM connector 115, a second conduit 190 communicating between the tee 185 and a water inlet of the secondary heat exchanger 165, a third conduit 195 communicating between a water outlet of the secondary heat exchanger 165 and a water inlet of the primary heat exchanger 160, and a fourth conduit 200 communicating between a water outlet of the primary heat exchanger 160 and the hot water outlet 70 through the bottom wall 25 of the cabinet 15. The water plumbing also includes a water pump 205 and a recirculation conduit 210 communicating between the recirculation return 80 and the tee 185. Other internal components include a small drain conduit 215 communicating between the second conduit 190 and the bypass drain 85, a condensate conduit 220 communicating between the condensate pan 170 and the condensate drain 90, and a gas supply conduit 225 communicating between the gas valve 150 and the combustor 155 of the power burner 140. The internal components also include various electrical connectors, wires, and sensors that communicate between the controller 130 and the other internal components to enable the controller 130 to operate the tankless water heater 10. The controller 130 and combustor 155 are shown schematically and are not necessarily in the exact positions shown in the drawings.

When there is a call for hot water (e.g., when the controller 130 senses or determines that there is flow of water through the tankless water heater 10 and performs all system checks necessary to start operation), the controller 130 energizes the power burner 140. When energized, the blower 145 draws air into the power burner 140 through the air intake 55. At the same time, the gas valve 150 is opened to permit the combustible gas to flow to the burner. The air provided by the blower 145 and the combustible gas provided by the gas valve 150 are mixed and then ignited at the combustor 155 to generate hot products of combustion. The products of combustion are forced under the influence of the blower 145 through the primary heat exchanger 160, secondary heat exchanger 165, condensate pan 170, flue 175, and out the exhaust 60. At the same time, supply water flows into the water heater 10 through the water inlet 65, through the first conduit 180, SCM cartridge 120 (where scale-inducing impurities are rendered non-binding and the water becomes treated water), second conduit 190, secondary heat exchanger 165, third conduit 195, primary heat exchanger 160, fourth conduit 200 and out the hot water outlet 70 to the hot water delivery system of the building and ultimately to an end user. The hot water flowing out of the primary heat exchanger 160 and secondary heat exchanger 165 can be referred to as heated treated water. It should be noted that the heat exchanger of the present invention is not limited to the specific primary heat exchanger 160 and secondary heat exchanger 165 illustrated and that the term heat exchanger is used to refer to either of those, the two in combination, and other types of heat exchangers that meet the basic functionality of transferring heat from the source of heat to the treated water to generate heated treated water.

The primary heat exchanger 160 includes finned tubes through which the treated water flows and over which the products of combustion flow to heat the water. The secondary heat exchanger 165 includes smooth tubes through which the colder water initially flows (prior to entering the primary heat exchanger 160) and over which the cooler products of combustion (having lost heat in the primary heat exchanger 160 prior to the primary heat exchanger 160) flow. The products of combustion condense in the secondary heat exchanger 165 and the condensate is collected in the condensate pan 170. The condensate drains from the condensate pan 170 through the condensate conduit 220 and out the condensate drain 90.

During standby (when there is no call for hot water), the water in the hot water delivery system of the building may drop below a desired temperature. In such an event, the controller 130 may energize the power burner 140 as described above and also energize the recirculation pump to move water from the recirculation return 80 through the recirculation conduit 210 to the second conduit 190 (thereby bypassing the SCM cartridge 120). The pump moves the water in a closed loop through the tankless water heater 10 and the hot water delivery system until the controller 130 determines that the hot water delivery system is loaded up with hot water again.

The illustrated SCM 110 includes the SCM connector 115 and SCM cartridge 120. The SCM connector 115 is rigidly fastened to or formed integrally with the bottom wall 25 of the cabinet 15 with the SCM connectors (SCM inlet 115*a*, SCM outlet 115*b*) extending into the interior space 50. In the embodiment illustrated in FIGS. 1-7, and with particular reference to FIGS. 6 and 7, the SCM connector 115 includes a mounting flange 230 with holes 235 through which fasteners are extended to mount the flange 230 against the bottom wall 25. The SCM connector 115 is rigidly mounted to the bottom wall 25. The term rigidly mounted to includes the illustrated arrangement and any other suitable way to create this rigid connection for the purpose described in the next paragraph. In particular, the SCM connector 115 is coupled to the cabinet 15 such that the SCM inlet 115*a* and the SCM outlet 115*b* extend outwardly from a first side of the flange 230 into the interior space 50, and the SCM cartridge 120 is removably mounted to a second side of the flange 230 opposite the first side.

The SCM cartridge 120 is detachably connected to the SCM connector 115 with ramped surfaces 240 (which also includes threads in other embodiments), such that the SCM cartridge 120 is connected to the SCM connector 115 by inserting the SCM cartridge 120 and giving the cartridge 120 a quarter or half turn in a tightening direction. The SCM connector 115 may include a valve that is unseated only when the SCM cartridge 120 is connected to avoid drainage of water when changing cartridges. The rigid mounting of the SCM connector 115 to the bottom wall 25 fixes the SCM connector 115 so that the SCM cartridge 120 can be turned or otherwise moved with respect to it into a connected condition, without having to separately hold the SCM connector 115 (e.g., with another hand, pair of hands or a tool). The rigid mounting of the SCM connector 115 thereby facilitates rotation of the SCM cartridge 120 with respect to the SCM connector 115 during installation and removal of the SCM cartridge 120.

The illustrated SCM connector 115 and SCM cartridge 120 are external components (i.e., outside of the interior space 50 of the cabinet 15) of the tankless water heater 10, except that the SCM connections (SCM inlet 115*a*, SCM outlet 115*b*) are internal to the cabinet 15. One advantage of an external SCM 110 is that the SCM cartridge 120 can be accessed for service without having to open the cabinet 15. Another possible advantage is that any leak of water in the tankless water heater 10 can quickly be assessed as coming from the internal components or the external SCM, so that the leak can be more quickly repaired.

Figure 8:
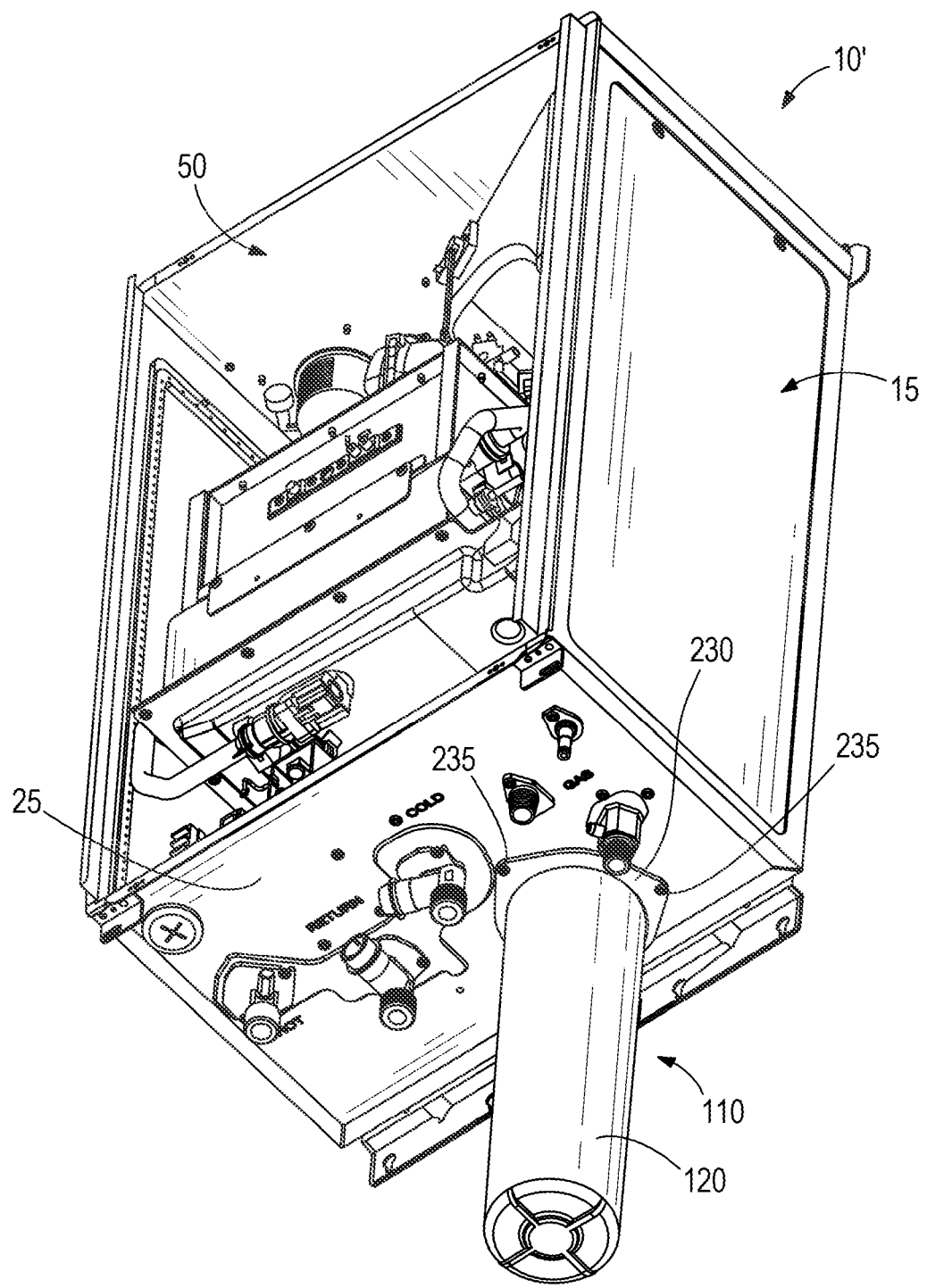
FIG. 8 is a perspective view of an alternative embodiment of the invention.

FIG. 8 illustrates another embodiment of the water heater 10' in which the SCM cartridge 120 is permanently mounted to the bottom wall 25 of the cabinet 15, without an intervening SCM connector. The SCM cartridge 120 must still include SCM connections (i.e., a SCM inlet and SCM outlet) to which the respective first water conduit 180 and tee 185 are plumbed. The plumbing may be by a threaded connection or by a permanent connection such that the cartridge 120 could only be removed from the water circuit by breaking the cartridge 120 or water conduits 180, 190. The components of the water heater 10' are essentially the same or equivalent to those described above, so the same reference numbers are used in FIG. 8 and not all reference numbers are provided. In this embodiment, the SCM cartridge 120 includes the flange 230 (i.e., the flange 230 having mounting holes 235 is integrally formed with or directly mounted to the SCM cartridge 120). In this embodiment, the SCM cartridge 120 is not replaceable because the SCM cartridge 120 has an expected useful life that is at least as long as the expected useful life of the overall tankless water heater 10'. In this embodiment of the water heater 10', the permanent SCM cartridge 120 is an external component although the SCM connections extend into the internal space 50.

Figure 9:
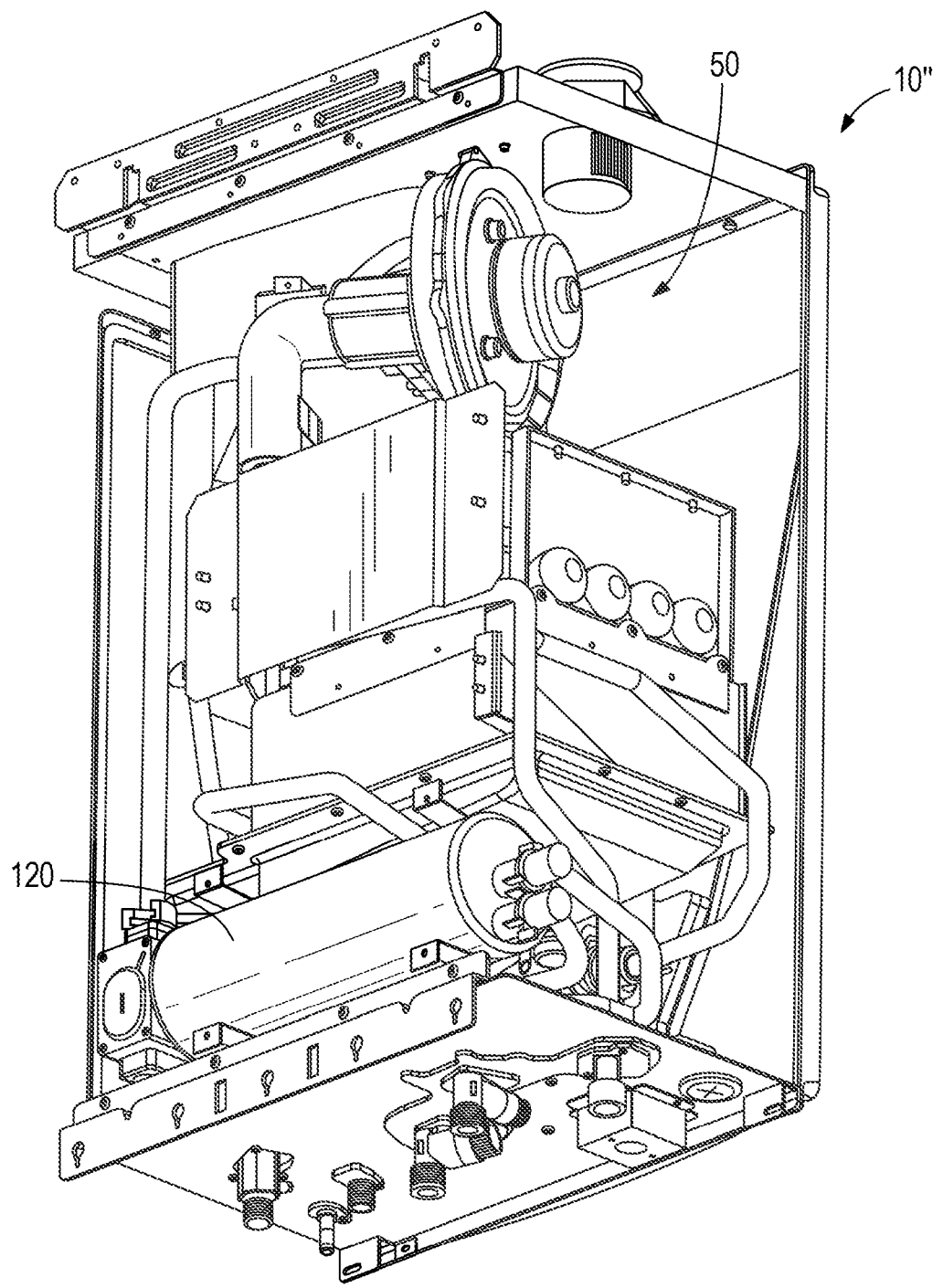
FIG. 9 is a perspective view of another alternative embodiment.

FIG. 9 illustrates another embodiment of the water heater 10" in which the SCM cartridge 120 is permanently mounted within the interior space 50 of the cabinet 15. The components of the water heater 10" are essentially the same or equivalent to those described above, so the same reference numbers are used in FIG. 9 and not all reference numbers are provided. The SCM connector 115 may be simplified or essentially eliminated in a permanent SCM because there is no need for a valve or threads in the SCM connector 115 since the SCM cartridge 120 will never be changed. As with other embodiments of the invention, the SCM cartridge 120 includes SCM connections in the form of a SCM inlet and SCM outlet that respectively receive and deliver water to and from the cartridge 120. The SCM connections are in the interior space 50 of the cabinet 15. In this embodiment, the SCM cartridge 120 is an internal component and is fully enclosed within the interior space 50 described above.

Thus, the invention is to cover all modifications, equivalents, and alternatives falling within the spirit and scope of the invention as defined by the following claims.

What is claimed is:
1. A tankless water heater comprising:
   a source of heat;
   a scale control module (SCM) for treating supply water to generate treated water with reduced scale-forming characteristics compared to the supply water, the scale control module including a SCM inlet adapted to receive the supply water and a SCM outlet for delivering the treated water from the scale control module;
   a heat exchanger having a water inlet in fluid communication with the SCM outlet to receive the treated water, the heat exchanger adapted to transfer heat from the source of heat to the treated water as the treated water flows through the heat exchanger to generate heated treated water, the heat exchanger including a water outlet for delivery of the heated treated water; and
   a cabinet defining an interior space which encloses at least a portion of the heat exchanger,
   wherein the SCM inlet and the SCM outlet are within the interior space, wherein the source of heat includes a gas burner generating products of combustion and the heat exchanger includes a plurality of finned tubes through which the treated water flows and over which the products of combustion flow, and wherein the scale control module includes a SCM cartridge in which the supply water is treated, the SCM cartridge being external to the cabinet.

2. The tankless water heater of claim 1, wherein the cabinet includes a wall to which the scale control module is rigidly mounted.

3. The tankless water heater of claim 1, wherein the scale control module further includes a SCM connector including the SCM inlet and the SCM outlet, and wherein the SCM cartridge is removably mounted to the SCM connector.

4. The tankless water heater of claim 3, wherein the SCM cartridge includes one or more ramped surfaces detachably engageable with the SCM connector.

5. The tankless water heater of claim 3, wherein the SCM connector is secured to an outer surface of the cabinet.

6. The tankless water heater of claim 3, wherein the SCM connector includes a flange, wherein the SCM inlet and the SCM outlet extend outwardly from a first side of the flange into the interior space, and wherein the SCM cartridge is removably mounted to a second side of the flange opposite the first side.

7. The tankless water heater of claim 1, wherein the scale control module includes a mounting flange for securing the scale control module to the cabinet.

8. The tankless water heater of claim 1, further comprising a first conduit communicating between a water supply inlet of the tankless water heater and the SCM inlet, and a second conduit communicating between the SCM outlet and the water inlet of the heat exchanger.

9. The tankless water heater of claim 1, further comprising a tee communicating with the SCM outlet.

10. The tankless water heater of claim 1, wherein the heat exchanger is a first heat exchanger, the tankless water heater further comprising a second heat exchanger in communication with the first heat exchanger.

11. The tankless water heater of claim 1, wherein the heat exchanger is fully enclosed within the interior space.

12. The tankless water heater of claim 1, wherein the heat exchanger and the source of heat are fully enclosed within the interior space.

13. A tankless water heater comprising:
a source of heat;
a scale control module (SCM) for treating supply water to generate treated water with reduce scale-forming characteristics, the scale control module including a SCM connector having a SCM inlet adapted to receive the supply water and a SCM outlet for delivering the treated water from the scale control module, and a SCM cartridge that is removably mounted to the SCM connector, the supply water being treated by the SCM cartridge to become treated water;
a heat exchanger having a water inlet in fluid communication with the SCM outlet to receive the treated water, the heat exchanger adapted to transfer heat from the source of heat to the treated water as the treated water flows through the heat exchanger to generate heated treated water, the heat exchanger including a water outlet for delivery of the heated treated water; and
a cabinet defining an interior space which encloses at least a portion of the heat exchanger,
wherein the SCM connector is secured to a wall of the cabinet such that the SCM inlet and the SCM outlet are within the interior space and the SCM cartridge is external to the cabinet.

14. The tankless water heater of claim 13, wherein the SCM cartridge includes one or more ramped surfaces detachably engageable with the SCM connector.

15. The tankless water heater of claim 13, wherein the SCM connector is secured to an outer surface of the wall of the cabinet.

16. The tankless water heater of claim 13, wherein the SCM connector includes a flange, wherein the SCM inlet and the SCM outlet extend outwardly from a first side of the flange into the interior space, and wherein the SCM cartridge is removably mounted to a second side of the flange opposite the first side.

17. The tankless water heater of claim 13, wherein the SCM connector includes a mounting flange for securing the scale control module to the cabinet.

18. The tankless water heater of claim 13, wherein the heat exchanger is fully enclosed within the interior space.

19. The tankless water heater of claim 13, wherein the heat exchanger and the source of heat are fully enclosed within the interior space.

* * * * *